2,956,097
PROMOTER FOR ISOMERIZATION REACTION

Neville Leverne Cull, Baker, La., Donald Schwartz, Moorhead, Minn., and Richard Joseph De Feo, Baton Rouge, La., assignors to Esso Research and Engineering Company, a corporation of Delaware No Drawing. Filed Mar. 25, 1959, Ser. No. 801,729

12 Claims. (Cl. 260—683.76)

The present invention relates to a process wherein straight chain paraffin hydrocarbons are converted into the more desirable branched chain hydrocarbons in the presence of aluminum halides, particularly aluminum bromide. The invention is especially concerned with a liquid phase paraffin hydrocarbon isomerization process wherein high yields and reaction rates are realized.

In general, in the petroleum industry isoparaffins and branched paraffin hydrocarbons are of greater commercial value than the corresponding straight chain hydrocarbons. The branched chain hydrocarbons in petroleum gasoline fractions have greater octane ratings than the corresponding straight chain hydrocarbons. This is of considerable importance in view of the increased demands for high anti-knock rating motor fuels to satisfy the requirements of modern high compression engines. One of the commercially important processes for supplying high octane motor fuels involves isomerization of the light naphtha components of such fuels.

The isomerization of normal paraffin hydrocarbons of from 4 to 7 carbon atoms into the corresponding branched chain homologs is well known. For effecting the isomerization it is customary to employ certain metal halides, particularly aluminum chloride or aluminum bromide, in conjunction with certain promoters, such as hydrogen chloride, hydrogen bromide or boron fluoride. Insofar as the isomerization of light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 40° to about 120° F.

However, even the more active aluminum bromide catalyst requires a substantial period of time, of the order of 1 to 8 hours, to bring the isomerization reaction to equilibrium. These equilibria are, of course, dependent upon reaction conditions and nature of the product being isomerized. To increase the rate of isomerization, it has in the past been suggested, as indicated above, to employ certain promoters, the best known being hydrogen halides, such as HBr and HCl, $BF_3$. The increases in rates achieved, however, have not been entirely satisfactory, are difficult to control, and present recovery and corrosion problems.

It is an important object of the present invention to set forth a novel class of promoters for the Friedel-Crafts type isomerization reaction which have none of the drawbacks of the prior art promoters and which lead to high isomer conversions in very short periods of time.

It is a further object of the present invention to employ in the isomerization of hydrocarbons in the presence of Friedel-Crafts catalysts a surface active agent unreactive in the presence of the catalyst but which promotes the isomerization reaction.

Other and further objects and advantages of the present invention will be made more clear hereinafter.

In accordance with the present invention the isomerization of normal paraffinic hydrocarbons having from 4 to 7 carbon atoms is conducted in the presence of aluminum bromide or an aluminum bromide comprising composition along with a perhalogenated carbonaceous compound wherein at least one of the halogen atoms is fluorine. Preferably at least 50% of the halogens are fluorine. In a preferred embodiment, an auxiliary hydrogen halide is also employed. Suitable for the purposes of the present invention are: perfluoro ethers, perfluoro alcohols, perfluoro acids, perfluoro esters, perfluoro amines and other perfluoro or nearly perfluorinated molecules having surface active functional groups. The perfluoro surface active materials may be used in conjunction with other promoters such as HBr, HCl, $BF_3$, and the like or they may be employed without such promoters.

It is preferred that the aluminum bromide be associated with suitable supports. Among the supports or carriers that may be used in this invention are included activated carbon, activated alumina, pumice, silica gel, fuller's earth, various activated clays and calcined bauxite. A partially dehydrated calcined bauxite known commercially as Porocel may also be used. Partial dehydration to prepare the Porocel for use may include heating for 2 to 3 hours at 1200° to 1400° F. or for from 15 to 18 hours at 900° to 1000° F.

The aluminum bromide may be placed on the support by impregnating the support with the bromide at an elevated temperature in the gas phase, or alternatively, a support can be placed in the reaction zone along with the hydrocarbon feed. Another method of preparation is to mix the aluminum halide with the support and to heat the mixture to effect impregnation. If desired, loosely held aluminum halide may be removed from the catalyst mass by heating the mass and passing through it a gas such as carbon dioxide, methane, hydrogen or nitrogen.

Alternatively the support may be impregnated by dissolving the aluminum halide in a suitable solvent such as ethylene dichloride or dioxane, for example, and the porous carrier impregnated with this solution, followed by heating to remove the solvent and loosely held aluminum halide. Still another alternative is to employ a powdered support or promoter, mix the aluminum halide with it, and compress the mixture into pellets.

The proportion of support to aluminum halide catalyst should be at least 2 to 1 by weight but from a practical standpoint should not exceed about 50 to 1. Stated conversely, the ratio of aluminum halide to support should be in the range of 2 to 50 parts of the halide for each 100 parts of support. The preferred range is from about 5 to 40 parts of aluminum halide per 100 parts of support.

The perhalogenated compound of the present invention may be employed in amounts ranging from .25 to 5.0% by weight, based on feed. Preferably, .5 to 2.0% is employed. The process for preparing these promoters is not a part of the present invention.

Although batch operations may be used, the process is preferably conducted as a continuous operation using flow rates of from about 0.1 to about 2 v./v./hr. (volume of feed per volume of total catalyst including support per hour). The apparatus employed may be of a conventional nature and may comprise a tower containing a fixed bed of the catalyst through which the reacting hydrocarbons are circulated, using an external recycle line to send the reactants back through the bed any number of times.

Aromatics and other materials that tend to be detrimental to the isomerization reaction may be removed from the feed by conventional means, such as acid treating, solvent extraction, mild hydrogenation or the like. Solvent extraction is preferred.

The following examples and data are offered to set forth the advantages of the present invention.

EXAMPLE 1

In the example below, 1 to 2% of "Kel-F Acid"

$$(Cl(CF_2CFCl)_2CF_2COOH)$$

(promoter A), was added to a batch fixed bed $AlBr_3$ catalyzed isomerization reaction. The critical effect of the temperature with this promoter is to be noted; at 90° F., the additive had little or no effect, while at 106° F. a 14 to 16% increase in hexane conversion is obtained.

*Isomerization data [1]*

| Run No | 7 | 8 | 31 | 64 | 65 |
|---|---|---|---|---|---|
| Feed | 90% n-Hexane+10% MCP | | | | |
| Catalyst | 10 Wt. Percent $AlBr^3$ on Feed | | | | |
| Support | 40 Wt. Percent Porocel on Feed | | | | |
| Temperature | 90.4 | 90.4 | 106 | 106 | 106 |
| "Kel-F Acid," Wt. Percent | 0.0 | 1.0 | 0.0 | 0 | 2.0 |
| Percent n-Hexane Conversion: | | | | | |
| 10 min | | | 7.0 | 4.0 | 13.4 |
| 20 min | | | 19.0 | 18.0 | 32.3 |
| 30 min | 19.6 | 15.5 | 29.0 | 30.4 | 46.3 |
| 60 min | 41.3 | 32.5 | 48.0 | 51.0 | 66.2 |
| 90 min | 51.8 | 45.0 | 61.0 | 63.2 | 76.8 |
| 120 min | 61.5 | 54.0 | 70.0 | 71.0 | |

[1] Data obtained in 500 ml. stirred reactor.

EXAMPLE 2

A further series of runs was carried out as shown below, in which various perfluorinated compounds were compared in terms of their activity to promote the isomerization reaction. In the runs below promoter A is the "Kel-F Acid" described in Example 1. Promoter B is a perfluorinated tertiary amine having the structure: $N(CF_2-CF_2-CF_2-CF_3)_3$; and promoter C is the perfluorinated ether $C_8F_{16}O$ having the probable structure:

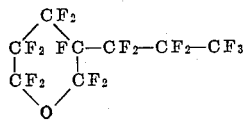

| Run No | 33 | 35 | 38 | 133 |
|---|---|---|---|---|
| Feed | 90% n-C$_6$+10% MCP | | | |
| Catalyst | 20 Wt. Percent $AlBr_3$ | | | |
| Support | 40 Wt. Percent Porocel | | | |
| Temperature, degrees | 105 | 105 | 105 | 105 |
| Time, hours | 1 | 1 | 1 | 1 |
| Additive Added | None | 1% Promoter A | 1% Promoter B | 1% Promoter C |
| Percent n-C$_6$ Isomerization | 72 | 81 | 84 | 91 |

These data were obtained in a 100 ml. stirred reactor.

EXAMPLE 3

The effect of an additional promoter such as HBr is shown in Example 3.

*Experimental comparison of promoters*

[20 wt. percent $AlBr_3$, 40 wt. percent Porocel support; 1 hour treat; temperature, 78° F.; feed: 90% n-C$_6$—10% methylcyclopentane]

| Additive added: | Percent n-C$_6$ isomerization |
|---|---|
| None | 24 |
| 1 atmosphere HBr | 30 |
| 1% promoter B | 30 |
| 1% promoter B+1 atm. HBr line | 37 |
| 1% promoter A | 29 |
| 1% promoter A+1 atm. HBr | 33 |

These experiments were made at room temperature (78° F.); however, at higher temperatures, e.g. 105° F. the promotional effect of the fluorocarbons is greater.

Though this invention has been described as being effective in the promotion of supported Friedel-Crafts catalysts, it may also advantageously be employed in conjunction with the promotion of so-called sludge catalyst systems. Thus, aluminum halides, like $AlBr_3$, form liquid catalyst systems when associated with complex-forming compounds. These co-catalysts, consisting of complexes of $AlBr_3$ with ketones, alcohols, ethers, amines, inorganic acids, water, or halogenated hydrocarbons, are normally liquid at reactor temperature and are largely insoluble in hydrocarbons. They may be employed in stirred or in "pool" reactors wherein the hydrocarbon feed is passed by gravity flow through a "pool" of catalyst. Particularly useful are co-catalyst systems of $AlBr_3$ and methyl alcohol and $AlBr_3$ and phosphoric acid. The function of the perhalogenated promoter here is not only to promote the reaction as indicated but also to serve as a surfactant to hold the $AlBr_3$-co-catalyst sludge in fine suspension in the hydrocarbon. The effect of having the catalytic sludge in a very finely divided state is to give a greatly increased reaction surface and thus better contacting of the catalyst and feed. This is obtained over and above the promotional effect inherent in the fluorine-containing perhalogenated carbon compound.

EXAMPLE 4

An active co-catalyst system employing the perfluoroamine compound, promoter C (perfluoro tributylamine), has been demonstrated.

*Experimental data*

RUN #173

[Catalyst: 20 wt. percent $AlBr_3$+25 wt. percent promoter C; no support; promoter: HBr, 1 atmosphere; temperature: 120° F.; stirred reactor; feed: 90% n-C$_6$—10% methylcyclopentane]

| Time: | Percent n-C$_6$ isomerization |
|---|---|
| 1 hour | 60 |
| 2 hours | 83 |

What is claimed is:

1. An improved process for isomerizing paraffinic hydrocarbons into more highly branched chain hydrocarbons which comprises contacting said hydrocarbons in the liquid phase with an aluminum bromide comprising catalyst promoted with about 0.25 to about 5.0% by weight of hydrocarbon of an organic perhalogenated surface active promoter, said promoter being further characterized in that at least 50% of the halogen atoms are fluorine.

2. An improved process for isomerizing paraffinic hydrocarbons having from 5 to 7 carbon atoms to more highly branched isomers which comprises contacting said hydrocarbons with an aluminum bromide catalyst in a liquid phase reaction zone at a temperature up to about 120° F., further maintaining in said zone 0.25 to 5.0% by weight, based on feed, of an organic perhalogenated surface active compound, said compound being characterized in that at least 50% of the halogen atoms are fluorine and that it contains at least one surfactive group, and recovering high yields of isomerization product.

3. The process of claim 2 wherein said catalyst is supported on an oxide carrier.

4. The process of claim 2 wherein said catalyst system is further promoted with a hydrogen halide.

5. The process of claim 2 wherein said perhalogenated compound is an ether.

6. The process of claim 2 wherein said perhalogenated compound is an amine.

7. The process of claim 2 wherein said perhalogenated compound is a carboxylic acid.

8. The process of claim 7 wherein said reaction temperature is at least 106° F.

9. The process of claim 5 wherein said perhalogenated compound is

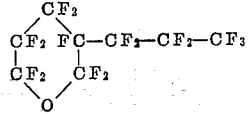

10. The process of claim 6 wherein said perhalogenated compound is $N(CF_2-CF_2-CF_2-CF_3)_3$.

11. The process of claim 7 wherein said perhalogenated compound is $Cl(CF_2CFCl)_2CF_2COOH$.

12. An improved process for isomerizing paraffinic hydrocarbons into more highly branched chain hydrocarbons which comprises contacting said hydrocarbons in liquid phase with an aluminum bromide comprising catalyst promoted with a perhalogenated organic compound selected from the group consisting of perhalogenated ethers, perhalogenated alcohols, perhalogenated acids, perhalogenated esters and perhalogenated amines, said promoter being further characterized in that at least 50% of the halogen atoms are fluorine.

References Cited in the file of this patent

UNITED STATES PATENTS

| | | |
|---|---|---|
| 2,376,509 | Sachanen et al. | May 22, 1945 |
| 2,410,894 | Montgomery | Nov. 12, 1946 |